Figure 1:
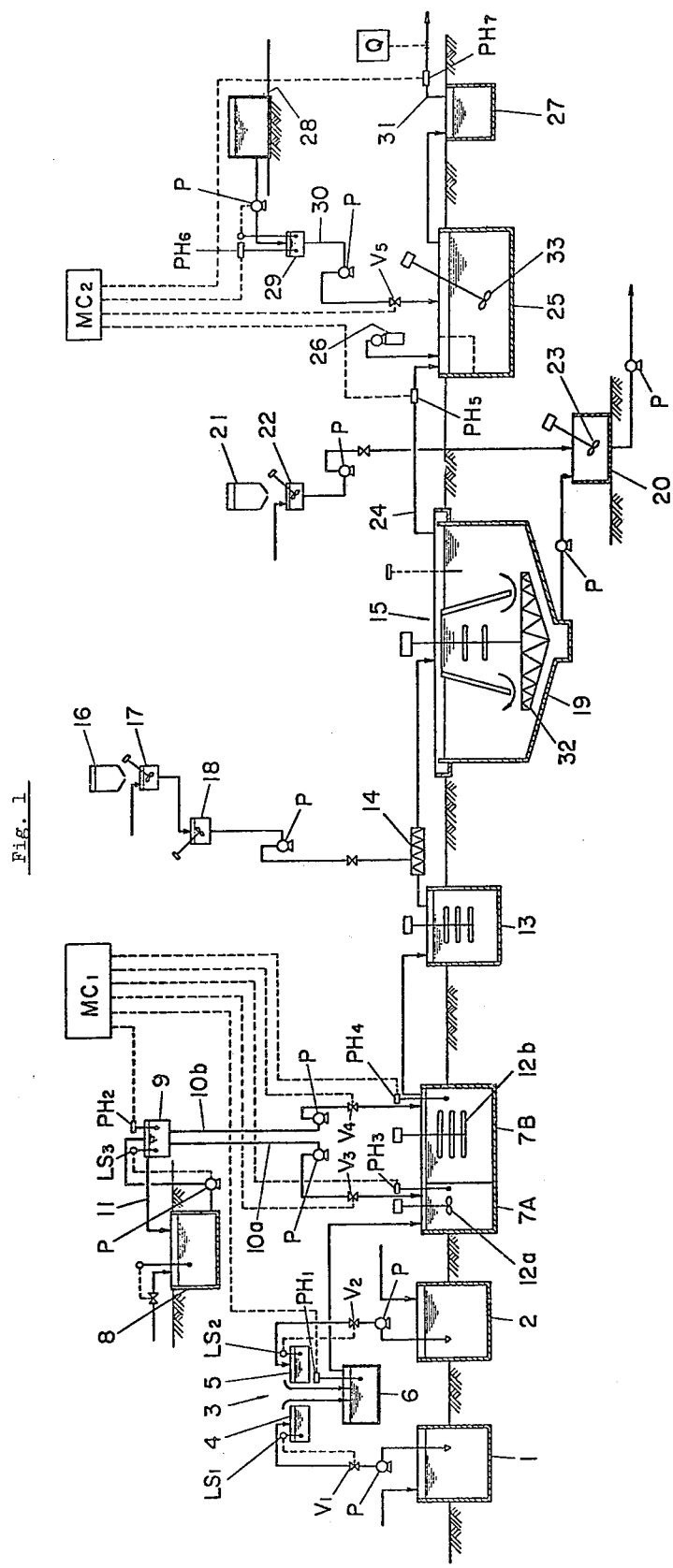

United States Patent [19]

Makino

[11] 4,228,003

[45] Oct. 14, 1980

[54] METHOD OF REMOVING PHOSPHATES FROM WASTE WATER

[75] Inventor: Yutaka Makino, Takasago, Japan

[73] Assignee: Takeda Chemical Industries, Ltd., Osaka, Japan

[21] Appl. No.: 30,873

[22] Filed: Apr. 17, 1979

[30] Foreign Application Priority Data

Apr. 21, 1978 [JP] Japan .................................. 53/48159
Jun. 30, 1978 [JP] Japan .................................. 53/79894

[51] Int. Cl.$^2$ ............................................. C02C 5/02
[52] U.S. Cl. .................................. 210/725; 210/907
[58] Field of Search ................... 210/42 R, 47, 51–54, 210/DIG. 29

[56] References Cited

U.S. PATENT DOCUMENTS

| | | | |
|---|---|---|---|
| 3,522,171 | 7/1970 | Spiegel et al. | 210/DIG. 29 |
| 3,716,484 | 2/1973 | Lincoln et al. | 210/DIG. 29 |
| 4,017,388 | 4/1977 | Albertson | 210/DIG. 29 |
| 4,098,689 | 7/1978 | Kobayashi et al. | 210/51 X |

*Primary Examiner*—Thomas G. Wyse
*Attorney, Agent, or Firm*—Wenderoth, Lind & Ponack

[57] ABSTRACT

Removal of phosphates from waste water can be attained with improved efficiency and at low cost by admixing the waste water with seawater and adjusting the mixture to pH 9–11 to separate the sedimental phosphates. The sediment can be utilized as phosphatic fertilizer.

6 Claims, 1 Drawing Figure

METHOD OF REMOVING PHOSPHATES FROM WASTE WATER

This invention relates to a method of removing phosphates from waste water by way of coagulation.

To cope with the excessive nutrition of rivers and waterways receiving waste water drains, technical studies have been made for the elimination of phosphates from municipal and industrial effluents and to this day, various methods including the coagulation method, biological method and selective ion exchange method, for instance have been proposed. The coagulation method has been considered to be the most advantageous of all the known methods for the removal of phosphates in view of efficiency and the cost of treatment but the conventional practice has not necessarily provided a satisfactory solution to the problem. Thus, since the conventional process comprises coagulating the phosphates with a coagulant or flocculating agent such as lime or a metal salt, it has not necessarily provided a satisfactory solution, for the process entails the use of costly chemicals and the formation of a large amount of sediment and, hence, a high overall cost of treatment especially when the cost of after-treatment is taken into consideration.

Municipal sewage and industrial effluents yearly amount to a large volume and while the quantity of water to be treated is thus large, the phosphates as dissolved in the waste water are present in very minor concentrations of the order of ppm units. Therefore, in order to reduce the concentration of phosphates to a tolerable level by ensuring a positive coagulation reaction of the coagulant with the phosphate in the waste water, a large amount of coagulant is required. This means a high cost of chemicals as well as an increased amount of sediment and a decreased phosphate content of the sediment. When the traces of phosphates dispersed in a large volume of waste water are to be removed, the addition of a stoichiometrically threshold amount of coagulant does not allow the expected reaction to take place within a practically acceptable time period. Therefore, to achieve the desired removal, it is necessary to add tens of equivalents of coagulant and since this practice gives rise to an excessively large amount of phosphate-lean sediment, it has entailed a difficult problem of after-treatment.

Under the circumstances we conducted an intensive research for developing a method of removing phosphates from waste water with improved efficiency and at reduced cost, and found rather surprisingly that satisfactory results can be obtained by using seawater which is available in quantities and at low cost as a coagulant or a part of a coagulant in the system. The above finding was followed by further studies, which revealed that if a phosphate-containing waste water is admixed with seawater in a predetermined ratio and the mixture is adjusted to a pH within a predetermined range, the phosphates in the waste water can be removed at low cost and with an efficiency at least comparable to that of the conventional process involving the use of lime, for instance. This invention is based on the above findings.

This invention is therefore concerned with a method of removing phosphates from waste water by way of coagulation and sedimentation, characterized by admixing the waste water with seawater in a volume ratio of 95:5 to 50:50 and adjusting the mixture to pH 9 to 11 to separate the sediment.

In the practice of this invention, the amount of seawater which is to be admixed with phosphate-containing waste water is particularly important. If this amount is less than a threshold limit, the percent removal of phosphates is too low; conversely if the amount is greater than a certain maximum limit, an excessively large amount of alkaline agent must be employed and an excessively large amount of sediment is produced. The increased volume of sediment, in turn, means an increased difficulty of after-treatment. In order that phosphates may be effectively removed, the mixing ratio by volume of waste water and seawater is 95:5 to 50:50 and, for better results, 90:10 to 70:30.

In the removal of phosphates by this procedure, it is another important requisite to adjust the pH of the mixture. Thus, if the pH is below 8.5, the percent removal of phosphates is too low; conversely if the pH is over 11.5, an excessively large amount of alkaline agent is required and, in comparison with the percent removal of phosphates that can be achieved, an excessively large amount of sediment is produced. The desirable pH range is between 9 and 11, and preferably within the range of 9.3 to 10.5.

When pH of the mixture is lower than the above range, the pH adjustment can be carried by adding an alkaline agent to the mixture of waste water and seawater. While said alkaline agent may be selected from among sodium hydroxide, potassium hydroxide and others, a spent alkaline liquor containing sodium hydroxide from a plant can be employed with advantage.

The above pH adjustment results in the formation of a sediment from the mixture of waste water and seawater and, if necessary, this coagulation can be accelerated by the addition of a small amount of a polymeric organic coagulant. As examples of said polymeric organic coagulant may be mentioned anionic coagulants such as sodium polyacrylate, salts of partially hydrolyzed polyacrylamide (e.g. Na, K, etc. salts), salts of maleic acid copolymers, cationic coagulants such as polyvinylpyridine hydrochloride, salts of vinylpyridine copolymers, and nonionic coagulants such as diallyldimethylammonium chloride polymers, polyacrylamide, polyethylene oxide, polyvinyl alcohol, etc. The level of addition thereof is about 0.1 ppm to 50 ppm and, preferably, about 1 ppm to 10 ppm in the mixture.

A dephosphorization trial was carried out using industrial effluents and municipal waste water containing phosphates in various concentrations. The percent removal of phosphates (as P), the amount of sediment and the phosphate content of the sediment (as $P_2O_5$) are shown below in Tables 1–7.

A similar trial was made using lime (Lime method) for the coagulation and sedimentation of phosphates and the corresponding results obtained by this conventional method are also shown in Table 1 as control. The determination of phosphates was made for total phosphorus by the Menzel's method.

TABLE 1

Percent Removal of Phosphates (industrial effluent containing 110 ppm of phosphorus)

| | Mixing ratio (by volume) | | | |
| pH | Effluent/seawater = 90/10 | Effluent/seawater = 70/30 | Effluent/seawater = 50/50 | Lime method |
| --- | --- | --- | --- | --- |
| 9.0 | 72 | 76 | 78 | 57 |
| 9.5 | 90 | 87 | 86 | 75 |
| 10.0 | 91 | 92 | 90 | 90 |
| 10.5 | 92 | 95 | 95 | 93 |

TABLE 1-continued

Percent Removal of Phosphates (industrial effluent containing 110 ppm of phosphorus)

| pH | Effluent/ seawater = 90/10 | Effluent/ seawater = 70/30 | Effluent/ seawater = 50/50 | Lime method |
|---|---|---|---|---|
| 11.0 | 93 | 98 | 98 | 94 |

TABLE 2

Percent Removal of Phosphates (industrial effluent containing 85 ppm of phosphorus)

| pH | Effluent/ seawater = 90/10 | Effluent/ seawater = 70/30 | Effluent/ seawater = 50/50 | Lime method |
|---|---|---|---|---|
| 9.0 | 65 | 72 | 74 | 45 |
| 9.5 | 80 | 82 | 83 | 65 |
| 10.0 | 88 | 88 | 90 | 79 |
| 10.5 | 90 | 90 | 92 | 89 |
| 11.0 | 91 | 92 | 94 | 92 |

TABLE 3

Percent Removal of Phosphates (industrial effluent containing 30 ppm of phosphorus)

| pH | Effluent/ seawater = 90/10 | Effluent/ seawater = 70/30 | Effluent/ seawater = 50/50 | Lime method |
|---|---|---|---|---|
| 9.0 | 58 | 64 | 70 | 41 |
| 9.5 | 71 | 76 | 79 | 63 |
| 10.0 | 80 | 82 | 84 | 74 |
| 10.5 | 90 | 91 | 92 | 85 |
| 11.0 | 93 | 93 | 94 | 92 |

TABLE 4

Percent Removal of Phosphates (municipal sewage containing 10 ppm of phosphorus)

| pH | Effluent/ seawater = 90/10 | Effluent/ seawater = 70/30 | Effluent/ seawater = 50/50 | Lime method |
|---|---|---|---|---|
| 9.0 | 12 | 16 | 15 | 21 |
| 9.5 | 51 | 58 | 59 | 52 |
| 10.0 | 86 | 89 | 88 | 81 |
| 10.5 | 88 | 96 | 94 | 91 |
| 11.0 | 89 | 99 | 99 | 97 |

TABLE 5

Amount of Sediment (industrial effluent containing 110 ppm of phosphorus)
(unit: Percentage with the dry weight of sediment obtained by lime method at each pH being taken as 100%)

| pH | Effluent/ seawater = 90/10 | Effluent/ seawter = 70/30 | Effluent/ seawater = 50/50 | Lime method |
|---|---|---|---|---|
| 9.0 | 79 | 101 | 116 | 100 |
| 9.5 | 81 | 92 | 105 | 100 |
| 10.0 | 74 | 89 | 95 | 100 |
| 10.5 | 69 | 99 | 131 | 100 |
| 11.0 | 66 | 142 | 266 | 100 |

TABLE 6

The Phosphorus Content of Sediment as $P_2O_5$
(Industrial effluent containing 110 ppm of phosphorus)
(Unit: Percent based on the dry weight of sediment)

| pH | Effluent/ seawater = 90/10 | Effluent/ seawater = 70/30 | Effluent/ seawater = 50/50 | Lime method |
|---|---|---|---|---|
| 9.0 | 43.5 | 35.9 | 32.2 | 31.0 |
| 9.5 | 43.3 | 36.8 | 32.2 | 30.6 |
| 10.0 | 41.5 | 32.8 | 30.2 | 28.5 |
| 10.5 | 37.0 | 28.0 | 24.0 | 26.5 |
| 11.0 | 33.9 | 20.0 | 15.0 | 21.9 |

The sediment obtained by the present process contains phosphorus in a form utilizable as phosphatic fertilizer in a high concentration. Therefor the sediment can be utilized as phosphatic fertilizer as it is or raw material therefor.

The following analytical data show the above fact.

TABLE 7

Components of sediment from industrial effluent
(Unit: percent based on the dry weight of sediment)

|  |  | 1 | 2 | 3 |
|---|---|---|---|---|
| Initial phosphorus concentration (ppm) | | 77 | 94 | 103 |
| Mixing ratio of effluent/seawater (by volume) | | 70/30 | 90/10 | 90/10 |
| pH | | 10 | 9 | 10 |
| Components of sediment (weight %) | Total P (as $P_2O_5$) | 32.6 | 41.7 | 41.1 |
| | Citric acid soluble P (as $P_2O_5$) | 30.5 | 41.5 | 40.8 |
| | $NH_3-N$ | 0.03 | 3.96 | 3.50 |
| | Ca | 15.4 | 11.2 | 11.4 |
| | Mg | 12.1 | 12.4 | 12.7 |
| | K | 0.11 | 0.81 | 1.06 |

As will be apparent from the above test results, the method of this invention is superior to the conventional coagulation-sedimentation method involving the use of lime in the percent removal of phosphorus, the amount of sediment and the $P_2O_5$ content of the sediment. Particularly with regard to the percent removal of phosphorus, the method of this invention provides high removal rates even when applied to phosphate-rich effluents and, therefore, is expected to be of value in the removal of phosphates at the source of P release in the production process, i.e. a stage involving a comparatively small amount of waste water prior to dilution by effluents from other production processes.

This invention will be described in further detail by reference to the accompanying drawing.

FIG. 1 shows a treating system embodying the dephosphorization method of this invention. This system comprises a stock waste water reservoir (1) for the storage of a waste water containing phosphates in concentrations of the ppm order, such as municipal sewage water or a secondary treatment water from an activated sludge process for organic industrial waste water, a seawater reservoir (2) for the storage of seawater, and a first-stage adjusting device (3) consisting of a waste water feed tank (4) which sustainedly stores a predetermined volume of waste water (raw water) pumped from said raw water tank, a seawater feed tank (5) which sustainedly stores a predetermined volume of seawater and a mixing tank (6) for admixing the waste water and seawater from said feed tanks (4) and (5) in a predetermined ratio. Indicated by reference symbols ($V_1$) and ($V_2$) are flow regulating valves which are controlled by level sensors ($LS_1$) and ($LS_2$) provided at feed tanks (4) and (5), respectively. The mixture of waste water and seawater from the mixing tank (6) is guided into a first-stage reactor (7A) in which it is stirred with an alkaline agent independently added there. The mixture is then fed to a second-stage reactor (7B) where it is adjusted to a predetermined pH value with a sufficient additional amount of alkaline agent under stirring.

Thus, the alkaline liquor is stored in an alkali liquor tank (8) and a predetermined portion of the liquor is pumped into a feed tank (9) for temporary storage. The liquor is then fed independently to said first-stage reactor (7A) and said second-stage reactor (7B) through feed lines (10a) and (10b), respectively. The reference symbols (11) and ($LS_3$) represent an overflow line from said feed tank (9) and a level sensor, respectively.

The said mixing tank (6) and feed tank (9) are provided with pH sensors ($pH_1$) and ($pH_2$), respectively, and said first-stage reactor (7A) and said second-stage reactor (7B) are provided with pH sensors ($pH_3$) and ($pH_4$), respectively. The pH of the mixture is primarily adjusted in said first-stage reactor (7A) and secondarily fine-adjusted in said second-stage reactor (7B) to the target pH level by means of flow regulating valves ($V_3$) and ($V_4$) which are respectively interposed in said feed lines (10a) and (10b) and controlled by a microcomputer ($MC_1$) based on information from said pH detectors. Indicated by reference symbols (12a) and (12b) are stirrers.

The pH adjusted mixture from said second-stage reactor (7B) is fed to a aging tank (13) where it is stirred and, then, fed to a flocculation tank (15) via a static mixer (14). The reference numeral (16) represents a hopper for supplying said polymeric organic coagulant. The coagulant from said hopper (16) is mixed well with water by stirrers (17) and (18) and the resultant solution is fed to an intermediate stage of the static mixer (14), the helical feeding motion of which causes the solution to be blended with the above-described mixture.

The whole mixture emerging from the bottom of said coagulation tank (15) into a clarifier (19) is separated there into a supernatant fluid and a sludge containing insoluble compounds and the latter sludge is collected by scraping in a pit and fed to a sludge holding tank (20). In this tank (20) it is stirred with a solution of said polymeric organic coagulant fed via a hopper (21) and a stirrer (21), followed by withdrawal into a sludge disposal plant not shown. The reference symbol (23) indicates a stirrer.

The supernatant fluid overflowing the clarifier (19) is guided into a pH adjusting tank (25) via a line (24) and sterilized in said tank (25) by a chlorine sterilizer (26). At the same time, the fluid is brought back to pH 7 with hydrochloric acid, sulfuric acid or the like under stirring and is then discharged from a discharge tank (27) into the open sea. The reference numerals (28), (29), (30) and (31) represent a hydrochloric acid tank, a HCl feed tank which sustainedly stores a predetermined amount of hydrochloric acid, a hydrochloric acid feed line and a discharge line, respectively.

The above-mentioned line (24), HCl feed tank (29) and discharge line (31) are provided with pH sensors ($pH_5$), ($pH_6$) and ($pH_7$), respectively, and the fluid in said pH regulating tank (25) is maintained at pH 7 by a flow regulating valve ($V_5$) which is interposed in said HCl feed line (30) and controlled by a microcomputer ($MC_2$) based on information from the pH sensors mentioned above.

In the drawing, the reference symbols (32), (33), (Q) and (P) designate a sludge collector, a stirrer, a flow rate recorder and a pump, respectively.

In accordance with the above treating system, the waste water to be treated is admixed with seawater in a predetermined ratio in said mixing tank (6) and the resultant mixture is guided into said first-stage and second-stage reactors (7A, 7B) where it is adjusted to a target pH value with alkali.

While the phosphorus-rich coagulates settle in the first-stage and second-stage reactors (7A, 7B) and in the aging tank (13), these coagulates appear to be the insoluble compounds formed by reaction of the phosphorus dissolved mainly as phosphate ions in the waste water with the various other components contained in the seawater.

As has hereinbefore been described, this invention is advantageous in that because the seawater available to any production facility on the coast at low cost and in large quantities is utilized as the coagulant, the necessary amount of any expensive chemical coagulant can be reduced and, while the desired level of removal of phosphates is fully maintained, the total amount of sediment can be reduced to effect a rationalized removal of phosphates from waste water as a whole. Particularly by the utilization of the spent alkaline liquor drained from the plant (e.g. the liquor originating from a deionized-water producing plant), the cost of chemicals can be further reduced and the dephosphorization treatment and the treatment of the spent alkaline liquor can be simultaneously accomplished to realize a further overall economy. Moreover, by selecting the operating conditions that will minimize the amount of sediment according to the required percent removal of P, it is possible to obtain phosphorus-rich sediments. Therefore, the after-treatment of sediments which is difficult with other processes is also facilitated.

We claim:

1. A method of removing phosphates from waste water which comprises admixing the waste water with seawater in a volume ratio of 95:5 to 50:50 and adjusting the mixture to pH 9-11 with an alkaline agent to separate the sedimental phosphates by way of coagulation.

2. A method according to claim 1, wherein the waste water and seawater are admixed in a volume ratio of 90:10 to 70:30.

3. A method according to claim 1, wherein the mixture is adjusted to a pH of 9.3 to 10.5.

4. A method according to claim 1, wherein the waste water and seawater are admixed in a volume of 90:10 to 70:30 and the mixture is adjusted to a pH of 9.3 to 10.5.

5. A method according to claim 1, wherein a polymeric organic coagulant is added to the mixture.

6. A method according to claim 1, wherein the alkaline agent is a spent alkaline liquor containing sodium hydroxide.

* * * * *